Dec. 27, 1966   J. A. M. LE DUC   3,294,587
FUEL CELL

Filed March 1, 1962   5 Sheets-Sheet 1

INVENTOR.
JOSEPH ADRIEN M. LEDUC
BY
ATTORNEYS
AGENT

Dec. 27, 1966 J. A. M. LE DUC 3,294,587
FUEL CELL
Filed March 1, 1962 5 Sheets-Sheet 2

INVENTOR.
JOSEPH ADRIEN M. LEDUC
BY G.H. Palmer
John C. Quinlan
ATTORNEYS
Maughin Klocty
AGENT Dec. 27, 1966    J. A. M. LE DUC    3,294,587
FUEL CELL Filed March 1, 1962    5 Sheets-Sheet 5

INVENTOR.
JOSEPH ADRIEN M. LEDUC

BY G.H. Palmer
John C. Quinlan
ATTORNEYS
Maughlin Klosty
AGENT

Dec. 27, 1966  J. A. M. LE DUC  3,294,587
FUEL CELL

Filed March 1, 1962  5 Sheets-Sheet 4

INVENTOR.
JOSEPH ADRIEN M. LEDUC
BY G.H. Palmer
John C. Quinlan
ATTORNEYS
Marylin Klooty
AGENT Dec. 27, 1966 J. A. M. LE DUC 3,294,587
FUEL CELL
Filed March 1, 1962 5 Sheets-Sheet 5

INVENTOR.
JOSEPH ADRIEN M. LEDUC
BY
ATTORNEYS
AGENT

United States Patent Office 3,294,587
Patented Dec. 27, 1966

3,294,587
FUEL CELL
Joseph Adrien M. Leduc, Short Hills, N.J., assignor to Pullman Incorporated, a corporation of Delaware
Filed Mar. 1, 1962, Ser. No. 176,535
18 Claims. (Cl. 136—86)

This invention relates to a new and improved process for converting the energy liberated by a chemical reaction directly into electrical energy. In a more particular aspect the present invention relates to an improved fuel cell capable of generating current of a relatively high voltage.

It is known that considerable time and money are being expended in order to develop electrochemical devices commonly referred to as fuel cells which are capable of transforming the energy released by chemical reaction directly into electrical energy. For each system, the theoretical or standard cell potential can be calculated using thermodynamic principles from the following equation:

$$E^0 = \frac{4183 \Delta F^0}{-nF}$$

wherein $E^0$=standard cell potential, volts (with reactants and products in a state of unit activity)
$\Delta F^0$=standard free energy change for the cell reaction in question, kilocalories
$n$=number of electrons transferred in the cell reaction (equivalents)
$F$=the faraday, 96,500 coulombs per equivalent.

It is seen, therefore, that the theoretical cell potential or E.M.F. (electromotive force) of any particular fuel cell is related to the free energy change associated with the chemical reaction taking place therein.

One type of fuel cell which has received considerable attention is the high pressure hydrogen-oxygen fuel cell; in this cell, hydrogen is used as fuel coupled with oxygen as the oxidant and is usually operated at a higher temperature of about 250–400° F., a pressure of from 300–600 pounds per square inch using about 20–40 percent aqueous potassium hydroxide as electrolyte. The calculated open circuit potential (O.C.P.) of this cell is 1.17 volts. The low temperature hydrogen-oxygen fuel cell which is usually operated at a temperature of 140–160° F. and at about ambient pressure to 150 pounds per square inch has a slightly higher calculated E.M.F. of 1.23 volts.

Another type of power cell is the so-called consumable electrode fuel cell. An example of this type is the sodium amalgam-oxygen fuel cell, the calculated open circuit potential of which is 2.2 volts when operated at 150° F. and ambient pressure using aqueous sodium hydroxide electrolyte and amalgam containing about 0.5 percent by weight of sodium. Although the E.M.F. based on the use of pure sodium is higher, advantage of the difference in free energy cannot be taken thereof in view of the high reactivity of pure sodium with the aqueous electrolyte. Another disadvantage, of course, is the fact that there are hazards involved in handling pure sodium as well as sodium in a dissolved state.

The voltage of an operating fuel cell is always less than the calculated cell potential, the decrease being due to certain unavoidable losses such as energy associated with the preparation of the fuel to a form suitable for use in the cell, polarization (activation, concentration, etc.), voltage drop caused by ohmic resistance as the current flows through electrodes, electrolyte and current conductors. It can be seen, therefore, that on the average basis fuel cells developed to date are capable of producing current of only lower voltage of the order of about 0.9–2.0 volts (O.C.P.) even at elevated temperatures, leaving much to be desired in the way of increasing power output. It is also manifested that any fuel cell which allows operation for even a few tenths of a volt higher represents, on a percentage basis, a large increase in power and a valuable contribution to the efficiency of fuel cells.

It is an object of this invention to provide an improved fuel cell capable of generating current of relatively higher voltage.

Another object is to provide a power cell from which high current densities can be drawn with minimized loss in power performance.

Another object is to provide a fuel cell having a good power ouput when operated at ambient temperatures and pressures.

Another object is to provide a fuel cell in which an aqueous electrolyte is employed and which generates current of higher voltage than presently known fuel cells.

A further object is to provide a cell which is readily adapted to continuous operation for a prolonged period of time without the necessity of continuously charging fuel from an external source.

A further object is to provide a fuel cell having the above characteristics and in which the fuel is one that is readily stored and handled.

A still further object is to provide an improved fuel cell and design therefor of the consumable electrode type.

A still further object is to provide a method for improving the power output of a fuel cell in which an alkaline earth metal is used as fuel coupled with oxygen.

Various other objects and advantages of this invention will become apparent to those skilled in the art from the accompanying description and disclosure.

Accordingly the above objects are accomplished by the process which comprises reacting a fuel comprising an alkaline earth metal and oxygen electrochemically in an aqueous medium comprising at least two water soluble compounds referred to herein as electrolyte A and electrolyte B; electrolyte A is a compound which renders the aqueous medium alkaline such as metal hydroxides, and electrolyte B is a metal salt. It has been found that the alkaline earth metal-oxygen fuel cell in which the aqueous medium comprises the combination of electrolyte A and electrolyte B generates electrical energy of higher voltage than previously known fuel cells. It also has been found that the electrolyte system of this invention renders the alkaline earth metal-oxygen system a more powerful fuel cell than one in which the aqueous medium comprises electrolyte A and no added electrolyte B.

In accordance with the teachings of this invention, an alkaline earth metal is employed as fuel. During operation of the power cell of this invention the alkaline earth metal is oxidized to the respective positively charged ions releasing electrons at the electrode with which it is in contact, namely, the anode. Of the alkaline earth metals employed, i.e., strontium, calcium and barium, barium metal is preferred and thus for illustrative purposes and convenience the following discussion is drawn primarily to the use of barium as fuel.

While the oxidation of the alkaline earth metal fuel is taking place at the anode, oxygen is being reduced at the other electrode, namely, the cathode and passes into the electrolyte as hydroxyl ions. The term "oxygen" as used herein includes pure molecular oxygen as well as oxygen-containing gases such as air and mixtures of oxygen with nitrogen or other inert gases in all mole ratios.

The oxidation reaction which takes place at the barium fuel electrode and the calculated E.M.F. thereof are as follows:

$$2Ba \rightarrow 2Ba^{++} + 4e \qquad E^0 = 2.90 \text{ volts} \qquad (1)$$

The reduction reaction and calculated potential of the oxygen half cell are as follows, which assumes that no peroxide ion is formed:

$$O_2 + 2H_2O + 4e \rightarrow 4OH^- \qquad E^0 = 0.401 \text{ volt} \qquad (2)$$

However, it is known that peroxide ion formation takes place according to the following equation:

$$O_2 + H_2O + 2e \rightarrow HO_2^- + OH^- \qquad (3)$$

the theoretical potential of which is minus 0.078 volt. A catalyst such as silver, manganese, iron, cobalt, nickel, rare earth metals, etc., can be added to the electrode or aqueous electrolyte bath to prevent the formation of peroxide or to decompose the peroxide ion according to the following equation:

$$HO_2^- \rightarrow OH^- + \tfrac{1}{2} O_2 \qquad (4)$$

The following equation expresses the dependence of the oxygen half cell on the activity (a) of peroxide ion which may form:

$$E = -0.030 \log a_{HO_2^-} - 0.055 \qquad (5)$$

As the activity or concentration of peroxide is decreased, the potential of the oxygen half cell increases, as shown by the following tabulation:

| $a_{HO_2^-}$ | E (volts) |
|---|---|
| 1 | −0.055 |
| $10^{-2}$ | +0.005 |
| $10^{-5}$ | +0.09 |
| $10^{-10}$ | +0.24 |

Thus the net chemical reaction of the barium-oxygen system is:

$$2Ba + O_2 + 2H_2O \rightarrow 2Ba^{++} + 4OH^- \qquad (6)$$

and the calculated E.M.F. thereof varies approximately between 3.30 volts and 2.8 volts, depending upon the activities of the various reacting species.

The above electrochemical reactions are effected by bringing the fuel and oxygen into contact with suitable electrodes in an aqueous medium to which electrolyte A and electrolyte B are added. Electrolyte A is defined herein as any water soluble compound which renders the aqueous medium alkaline by yielding hydroxyl ions and includes metal hydroxides or soluble oxides which when dissolved in water yield hydroxyl ions. Typical examples of suitable compounds of this group are the alkali metal hydroxides such as sodium hydroxide, potassium hydroxide and lithium hydroxide; alkaline earth metal hydroxides including barium hydroxide, calcium hydroxide and strontium hydroxide; and soluble oxides such as barium oxide, calcium oxide and strontium oxide. Of these, the alkali metal hydroxides and particularly sodium hydroxide are preferred.

Electrolyte B, as defined herein and which also is added to the aqueous medium, is a metal salt and includes inorganic and organic salts such as the halides, oxyhalides, thiocyanates and acetates of the alkali metals, the alkaline earth metals and of metals of Groups IIB, IIIA, V and VIII. Typical examples of suitable compounds of this group are barium chloride, barium thiocyanate, barium chlorate, barium acetate, strontium chloride, calcium chloride and aluminum chloride. Of these, the alkaline earth metal halides, particularly the chlorides, are preferred.

It is to be understood that within the scope of the present invention is the addition to the aqueous medium of more than one compound from each of the groups falling within the scope of the definition of electrolytes A and B. In addition to adding a compound falling within the scope of the definition of Electrolyte A, it may be formed in situ during operation of the cell. For example, when the combination of added electrolytes is an alkali metal hydroxide and barium chloride, barium hydroxide is formed as the barium is oxidized at the anode. Such a three-compartment electrolyte system is very effective even when the aqueous medium contains a very substantial amount of precipitated barium hydroxide.

The function of electrolyte A is to yield hydroxyl ions while the function of electrolyte B is to yield metal ions. It has been found that when hydroxyl ions and metal ions are added to the aqueous medium from different electrolytes in accordance with the teachings of this invention, the power output of the barium-oxygen fuel cell is greater than when such ions are added to the aqueous medium from the same electrolyte.

The aqueous medium contains electrolyte A and electrolyte B in amounts varying over a relatively wide range such that the aqueous medium is dilute or saturated with respect to each of these electrolytes. Generally, electrolyte A is added in an amount sufficient to yield a hydroxyl concentration between about 0.01 and about 20 molar, and electrolyte B is added in an amount sufficient to yield a concentration of metal ion of between about 0.05 and about 5 molar. Within these ranges the power performance of the cell is greatest when the hydroxyl ion concentration of the aqueous medium is between about 0.8 and about 0.2 molar and the concentration of metal ion is correspondingly between about 0.2 and about 1.0 molar. Within these preferred concentrations at which the power performance of the cell is greatest, the ionic strength of the aqueous medium is between about 1 and about 3.

In addition to the fact that the power output of the alkaline earth metal-oxygen fuel cell is increased when electrolyte A and electrolyte B are added to the aqueous medium, the electro-chemical conversion efficiency of the cell is also improved, the aqueous electrolyte system of this invention suppressing the tendency of the alkaline earth metal fuel to react chemically with the water of the aqueous medium.

The temperature at which the electrolyte is maintained and at which the fuel cell is operated varies between about 20° and about 250° C. The preferred operating temperature of the cell ranges between about 20° and about 90° C.

The cell also may be operated over a wide range of pressure and generally the pressure is between atmospheric and about 700 pounds per square inch. The pressure and temperature conditions are interrelated to the extent that any combination may be employed with the preferred limitation that they are regulated to maintain the electrolyte in the liquid phase. Although good performance is realized at room temperature and atmospheric pressure, the electrode surface tends to increase in temperature when the cell is operated at high current densities of the order of about 200–300 amperes per square foot of apparent electrode surface and higher. Thus from the standpoint of continuous generation of current of such high current intensities, it is usually preferred to pressurize the cell even when operating at room temperature.

It is to be understood that the term "apparent electrode surface" as used herein with respect to expressing current density, is defined as the geometric dimensions of the electrode without consideration of the surface area contributed by the porous surface of the particular electrode.

The fuel cell of this invention is operated at any desired current density and voltage depending upon the design of each individual cell and the manner in which two or more cells are interconnected. When barium is employed, the open circuit potential of the fuel cells of this invention is approximately 2.65 volts. The barium-oxygen system generates power at current densities up to about 1000 amperes per square foot of apparent electrode surface, the power curve of this system being shown by the graph of accompanying FIGURE 1.

When it is desired to produce current of high amperage and low voltage, individual fuel cells are connected in parallel and in producing current of low amperage and high voltage, individual fuel cells are connected in series as known to those skilled in the art.

For a better understanding of the present invention, reference is made to FIGURES 4–9 of the accompanying drawings.

Figures 4, 5:
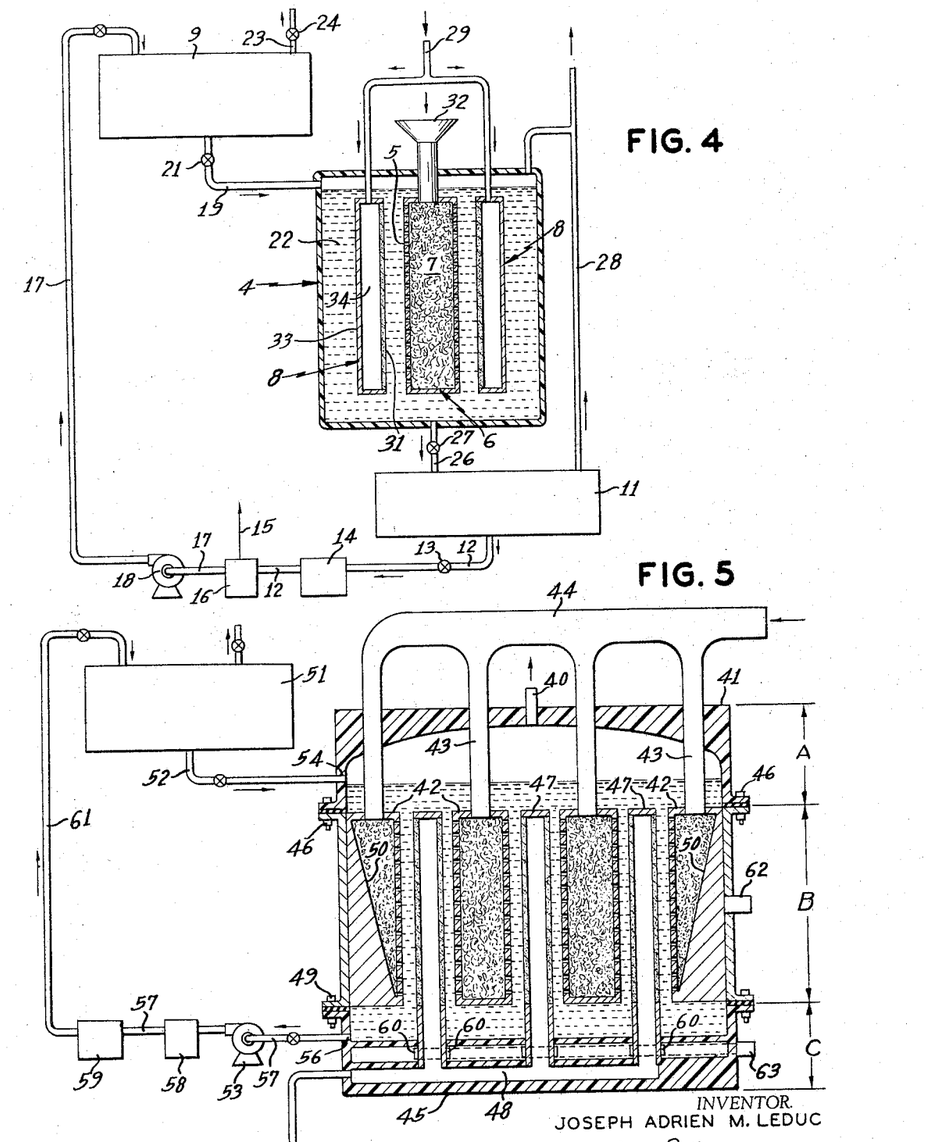
FIGURES 4–7 represent longitudinal views in elevation of suitable apparatus in which the electrochemical reactions of this invention may be effected.

The barium-oxygen fuel cell illustrated by accompanying FIGURE 4 comprises the cell container 4 having disposed therein electrodes typically illustrated by electrode assembly 6 and 8, and is provided with electrolyte feed source 9 and electrolyte reservoir 11, reservoir 11 being connected to the electrolyte feed source 9 by means of lines 12 and 17 having cooler 14, filtration zone 16 and pump 18 thereon.

The inner walls of the cell body 4 is composed of any suitable material or coated material which is chemically inert to the electrolyte and chemicals produced by the cell and is also an electrically non-conductive material such as vinyl or other plastic or resin, rubber, refractories, or coated metals, etc. The cell body may have a cross section of any desired shape such as circular, rectangular or square.

The barium fuel 7 is in the form of particles of any suitable and convenient shape and dimensions such as chunks, wires, chopped wires, broken pieces or slices of barium. The fuel also may be employed in the form of fluidized particles. That portion of fuel electrode 6 barium fuel 7 contained therein which is submerged in electrolyte 22 is composed of an electroconductive metal such as steel, stainless steel, nickel etc. At least that portion of fuel electrode 6 which faces gas electrode 8 is in the form of a screen or other perforated or porous structure 5 having apertures sufficiently small to retain the fuel particles within the electrode. Fuel electrode 6 is provided with a means for introducing fuel particles to the interior of the electrode. Although the fuel inlet 32 is shown in FIGURE 4 as a funnel-shaped inlet port, it is to be understood that any automatic feeding devices are suitable. The inlet port may be connected to means (not shown) in which the barium fuel is machined to the desired particle size and shape.

The gas electrode employed in the fuel cells of this invention comprise an electrically conductive material through which the gaseous oxygen diffuses towards the surface in contact with the aqueous electrolyte. The electroconductive material is any one of the elements of Groups IB, IIB, III–VIII, inclusive, of the Periodic Chart of the elements, as well as the rare earth metals and any combination thereof. The conductor may be in the form of sintered powder or specially prepared porous metal, or carbon. Also included within the scope of this invention is a gas diffusion electode comprising the electrically conductive metal including salts, oxides, etc., thereof homogeneously distributed at least within the pores of an inert substrate such as polyethylene prepared in accordance with the methods disclosed in my prior and co-pending application Serial Number 162,221, filed December 26, 1961, now U.S. Patent No. 3,235,473. The cathode also may be composed of carbon or graphite and may contain catalysts such as silver-silver salt additives.

In view of the fact that the oxygen which is brought into contact with the electrolyte and which undergoes chemical reaction is in the gaseous state, it is preferred that the cathode be in the form of a hollow member provided with an inlet for introducing the gaseous reactant therein. One such form is illustrated by gas electrodes 8 of the accompanying FIGURE 4 which comprises the electrically conductive porous surface 31 and support 33 which together enclose space 34 into which the gaseous oxygen is introduced under a slight pressure by means of inlet 29 which feeds each of gas electrodes 8.

In operating the cell of figure 4, aqueous electrolyte 22 containing sodium hydroxide and barium chloride, for example, is fed to the cell from reservoir 9 by means of line 19 having valve 21 thereon in an amount sufficient to fully immerse electrodes 6 and 8. As the electrochemical reactions proceed, additional barium ions form and when the electrolyte becomes saturated with barium hydroxide, it is withdrawn from the lower portion of the cell by means of line 26 having valve 27 thereon into electrolyte reservoir 11. The electrolyte is then passed into cooler 14 by means of line 12 having valve 13 thereon wherein the electrolyte is cooled to precipitate barium hydroxide. The solution and precipitate are then passed to filtration zone 16 wherein solid comprising barium hydroxide is separated and withdrawn therefrom by means of line 15 and subjected to further purification as my be necessary to remove contaminating electrolyte salts. The filtrate is then pumped through line 17 by means of pump 18 and is returned to electrolyte feed reservoir 9. By proper control of the rate of introduction of electrolyte into and out of the fuel cell, the cell is operated at any desired substantially constant concentration of barium and hydroxyl ions. The cell is also provided with vents 23 and 28 to prevent build-up of water vapor pressure within the respective electrolyte reservoirs, and by means of which unreacted gases are vented. When the fuel cell is not in operation, electrolyte is removed therefrom and is conveniently stored in reservoir 11 so that the barium fuel is not in contact with the aqueous electrolyte.

It is to be understood that although the fuel cell of FIGURE 4 is shown with the single barium electrode positioned between two gas diffusion electrodes, the cell may contain any number of alternating barium and oxygen diffusion electrodes in which case the type of gas electrode shown in the drawing is positioned at either end of the cell and the other gas electrodes have a completely reactive and conductive porous surface as illustrated by the accompanying FIGURE 5.

In accordance with the accompanying FIGURE 5 a three-section fuel cell is typically illustrated comprising: (A) an upper section or dome 41 having vent 40 which is connected to the middle section of the cell by any suitable means such as bolts 46; (B) the middle or anode section comprising fuel electrodes 42 connected to barium feed inlet 43 which in turn is connected to manifold 44; and (C) the bottom section comprising the base of the cell 45 connected to the middle section by bolts 49, and to which the gas diffusion electrodes 47 and current distribution grids 60 (wires or bars) are fastened and attached to cathode terminus 63. The upper section (A) and lower section (C) of the cell are composed of, or coated with, an electrically non-conductive material and may be, for example, cement coated metals, whereas the middle section (B) is made of an electrically conductive material such as steel or other metal.

Barium electrodes 42 are of the type described above in connection with FIGURE 4 and comprise barium particles contained within the perforated support. In order to facilitate the flow of barium particles into the end electrodes, and to avoid the accumulation of particles therein which do not become subjected to the electrochemical reaction taking place at the surface thereof, they are shaped as shown, the terminal portions 50 having a substantially triangular cross section and being composed of a solid conductive material connected to the walls of the metallic middle section (B) having anode terminus 62 thereon.

As shown in FIGURE 5 of the drawing, the barium electrodes 42, except for the outer ones, are positioned between the reactive porous surface of gas electrodes 47 which are fed with oxygen by means of inlet 48 positioned in the base of the cell, the gas flowing in an upwardly direction. In operation, the barium and oxidant are fed to the anode and the cathode, respectively, and aqueous electrolyte is fed to the cell from electrolyte reservoir 51 by means of line 52 and cell inlet 54. As shown in the drawing the electrolyte is pumped in a downwardly direction passing between the outer surfaces of the anodes and cathodes. It is to be understood, however, that the electrolyte may also be charged to the cell by means of an inlet positioned within the lower section of the cell such that the flow is in an upwardly direction. The lower section (C) of the cell is provided with electrolyte outlet 56 which in turn leads into line 57 having pump 53 thereon, the electrolyte again being passed into cooler 58, filtration zone 59 and through line 61 into electrolyte reservoir 61 as described above.

The type of cell structure shown in FIGURE 5 is readily disassembled, which feature is particularly advantageous when it becomes necessary to clean the cell, replace component parts and electrodes or transport the cell.

The fuel cells of this invention are such that fuel may be stored within the cell in any amount required to operate it for a prolonged period of time without the necessity of carrying fuel by external means or continuously charging fuel to the cell. In accordance with this embodiment of the present invention, the cell is charged with a pre-determined quantity of barium in the form of solid plates or blocks, the quantity being calculated according to the power demand. As the electrochemical reactions proceed, barium metal is consumed by conversion to barium ions and the thickness of the block of fuel is decreased while the gap of electrolyte between the fuel electrode and the gas diffusion electrode is correspondingly increased. The gap of electrolye is usually maintained between about .07 and about 0.25 inch. As the barium metal is consumed the blocks of barium are moved by mechanical or motor-driven means towards the gas diffusion electrodes in order to maintain the distance between them. The displacement of the electrodes can be monitored by a sensing device located between the electrodes which, upon demand (external load, gap of electrolyte), is moved accordingly. A constant displacement is effectuated when the external load is constant. This particular embodiment of the present invention is illustrated by the accompanying FIGURES 6 and 7, which illustrate two means of accomplishing movement of the electrodes, namely, by the sliding assembly of FIGURE 6 and the accordion-like cell shown in FIGURE 7.

Figure 6:
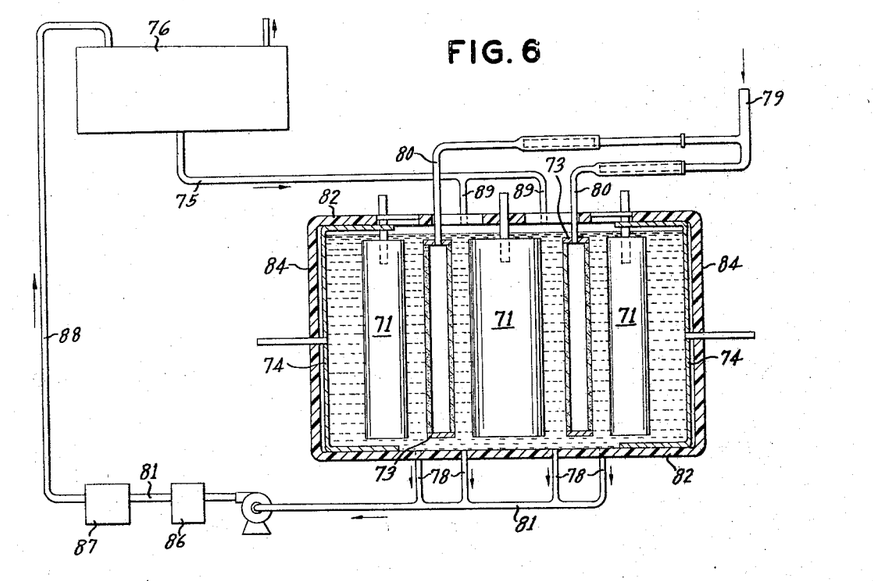

The cell illustrated by FIGURE 6 comprises fuel electrodes 71 in the form of solid blocks of barium having positioned therebetween gas diffusion electrodes 73 which are fed with oxygen by means of inlet 79. Electrolyte is fed to the cell by means of inlet manifold 75 which is fed electrolyte from source 76.

The casing of the cell body comprises walls 82 and 84 which enclose the inner movable walls 74. To accomplish movement of the electrodes as the barium fuel is consumed, pressure is exerted on inner section 74 by mechanical or electrically driven means causing section 74 to move inwardly thereby also moving the fuel electrodes along the upper part of the cell casing 82. Additional support is provided for barium electrodes 71 by connecting them to lower casing 82 in which event the lower casing is also provided with means for movement of the electrodes such as the sliding means shown within the top casing. The connecting lines such as oxidant manifold 79, electrolyte inlet 75, as well as electrolyte outlet 81 are constructed of flexible tubing in the form of a coil or spring, or as shown in the drawing, specifically with respect to manifold 79, they may be composed of sections which slide or pass one within the other like the sections of a telescope. Another means for effecting movement of the gas diffusion electrodes, electrolyte inlet and outlet lines, comprises rolling connecting lines 80, 89 and 78, respectively, along their respective distributing manifolds. The circulation of electrolyte and removal of precipitated barium hydroxide product is accomplished as described above by passing the electrolyte from the cell through outlet 81 into cooler 86 through filtration zone 87, line 88 and into electrolyte reservoir 76.

Figure 7:
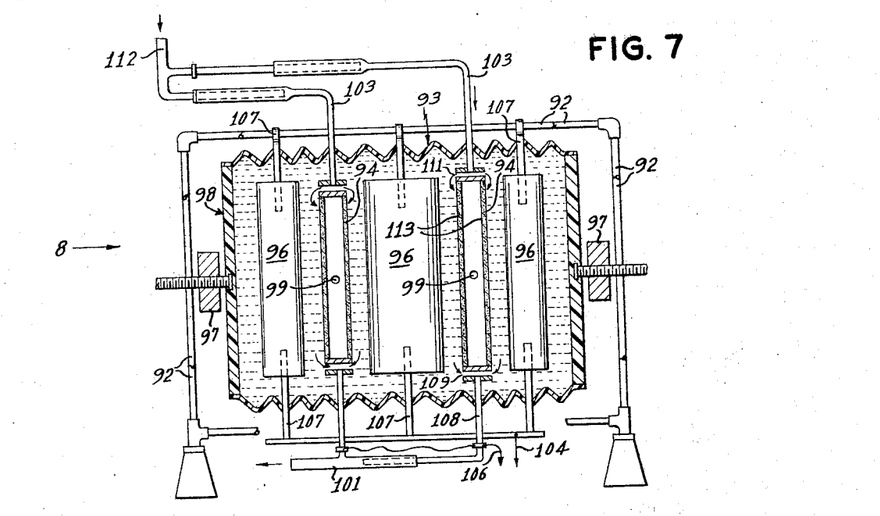

Another illustration of apparatus particularly useful for operation of the cell to which a predetermined quantity of barium metal is charged is illustrated by the accompanying FIGURE 7. This apparatus comprises support bars 92 having disposed therein bellows 93 to which gas electrode assembly 94 and fuel electrodes 96 are fastened by line 108 and bars 107, respectively. The bellows themselves are interconnected by end bars 98 having plates 97 fastened thereto. The gas and fuel electrodes are also connected to the upper and lower support beams 92 by means such that the electrodes are readily moved such as by rolling or sliding means along the support. In operation, oxygen is fed to the gas electrodes by means of inlet 99 and aqueous electrolyte is charged to, and discharged from, the cell by means of movable manifolds 112 and 101, respectively, which are connected directly to the gas electrodes by the individual inlet 103 and outlet 108, respectively.

As the barium metal is consumed, pressure is exerted by various means on plates 97 causing end plates 98 to move inwardly thereby also effectuating contraction of bellows 93 and concomitant movement of the electrodes inwardly. As noted above in connection with FIGURE 6, the displacement of the assembly can be monitored by a sensing device located between the electrodes which, upon demand, are moved accordingly. The fuel and gas electrodes are connected to flexible and movable bus bars 104 and 106, respectively, by means of which current is withdrawn from the cell.

Figure 8:
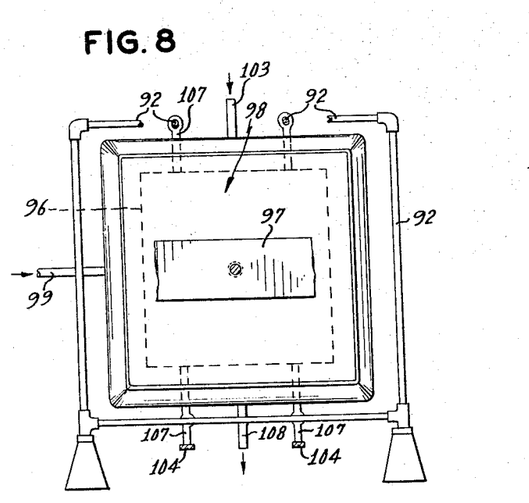
FIGURE 8 represents an end view in elevation of the apparatus of accompanying FIGURE 7.

The accompanying FIGURE 8 is an end view of the cell illustrated in FIGURE 7, the numerals being the same as those employed to designate the corresponding parts shown in side elevation.

As shown in detail in FIGURE 7, gas diffusion electrodes 94 comprise: an inner hollow section to which gaseous oxygen is fed through inlet 99 leading into the middle section of the electrode, the two electroconductive porous surfaces 113, upper section 103 through which electrolyte is fed from distributing manifold 112 and from which electrolyte passes into the cell through apertures 111, and a lower section 108 having apertures 109 through which electrolyte flows and passes out the cell and into electrolyte outlet manifold 101. As shown in FIGURE 7, the upper and lower apertures 111 and 109, respectively, of gas electrodes 94 may either be aligned with the fuel electrodes as shown by electrode 94 positioned to the left of the center fuel electrode, or above and below the fuel electrode as shown by the electrode positioned to the right of the center fuel electrode. The latter type of electrode is usually preferred inasmuch as it allows operation of the gas diffusion cathode at a current density approximately equivalent to that of the fuel electrode. This type of gas electrode which has the additional function of serving as the inlet and outlet for electrolyte is particularly suitable for the type of fuel cell illustrated by FIGURES 6 and 7. It is to be understood, however, that such gas diffusion electrode may also be used in fuel cells in which barium fuel is continuously fed to the system.

Figure 9:
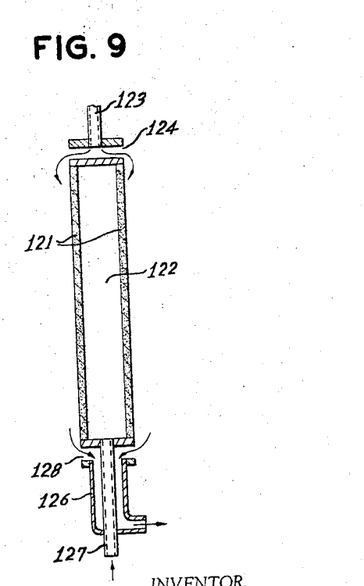
FIGURE 9 is a cross sectional view in elevation of a suitable cathode assembly.

A modification of the above-described gas electrodes 94 is illustrated by FIGURE 9 and essentially comprises electroconductive porous surfaces 121 through which the oxidant diffuses from enclosed space 122 to which gas is fed by means of inlet 127. The upper portion of the electrode comprises inlet 123 having openings 124 through which the aqueous electrolyte is fed to the cell. The lower portion of the electrode also comprises electrolyte outlet 126 having openings 128 through which electrolyte flows and passes out of the cell. Oxidant inlet 127 and electrolyte outlet 126 may be two separate tubes or, as shown in the drawing, may be positioned in concentric relationship.

In accordance with another embodiment of the process described herein, the alkaline earth metal fuel is used in combination with another metal component including elemental metals and intermetallic compounds, as well as hydrides, carbides, nitrides and metal salts. For example, alloys of the alkaline earth metal with one or more of the following metals may be employed: metals of Group IB such as copper, silver and gold; metals of Group IIA such as magnesium; metals of Group IIB such as cadmium, zinc and mercury; metals of Group IIIA such as aluminum; metals of Group IVA such as lead and tin; metals of Group VA such as bismuth and antimony; metals of Group VIB such as chromium, molybdenum and tungsten; the iron group metals of Group VIII, i.e., iron, cobalt, and nickel, as well as the rare earth metals such as lanthanum. In addition to alloys of the alkaline earth metal with another elemental metal, the term "alloy" as used herein is also intended to include admixtures of the alkaline earth metal with nitrides, carbides and hydrides of one of the above-enumerated metals, and admixtures of the alkaline earth metal with intermetallic compounds such as selenides, silicides and tellurides.

The alkaline earth metal content of such alloys varies over a relatively wide range such as from 0.1 to 99 percent by weight based on the total weight of the alloy. In the case of the solid alloys, that is, other than liquid amalgams with mercury (i.e., amalgams containing a relatively low content of the alkaline earth metal of between about 0.1 and about 2 percent by weight), the alkaline earth metal is usually present as the major constituent. Thus in the case of the solid alloys, the alkaline earth metal content is usually at least 50 percent by weight based on the total weight of the alloy and is preferably between about 80 and about 98 percent by weight.

The solid alloys are prepared by various techniques. One method comprises melting of the alkaline earth metal and the alloying metal, admixing the melt and solidifying the mixture to form solid solutions of the alkaline earth metal and alloying component. For example, between about 85 and about 95 parts by weight of barium and correspondingly between about 15 and about 5 parts by weight of lead are melted and mixed to cast the alloy.

In this manner, an alloy containing barium and lead in a weight ratio of 9:1, for example, is prepared and is particularly useful in the fuel cells described herein.

Another method of preparing the alloy comprises physically admixing solid particles of the alkaline earth metal and particles of the alloying metal under an inert atmosphere such as helium or argon. After thorough mixing, the admixture is compressed with or without the application of heat to pressures of the order of between about 2 and about 25 tons per square inch. Usually, the particle size of the alloying metal is less than that of the alkaline earth metal such that the finer particles also coat the particles of the alkaline earth metal. For example, a barium-zinc alloy in which the barium is also coated with particles of zinc is prepared by physically admixing thoroughly particles of barium (100 mesh) with very fine zinc powder (about −325 mesh) under a helium atmosphere in a weight ratio of barium to zinc of about 9:1 at a temperature of about 50° to about 100° C. (e.g., 75° C.) followed by compression of the admixture under a pressure of about 20 tons per square inch.

In accordance with another method of preparing the alloy, the alloying metal or salt thereof is melted and vaporized in an inert atmosphere when the metal is employed, and in a hydrogen atmosphere when a salt is used, followed by deposition of the vapors onto the surface of the alkaline earth metal under an inert atmosphere. For example, in accordance with this technique, tin is vaporized at a temperature between about 1200° and 1300° C. under a vacuum of about 10–20 mm. mercury pressure and in an inert residual atmosphere such as helium or argon. When a halide of tin is employed, it is vaporized at about 600° C. in a hydrogen atmosphere. In each case the vapors of tin are then brought into contact with barium particles (50–100 mesh) at the indicated temperature until the total concentration of tin deposited on the surface of the barium is between about 1 and about 8 percent by weight (e.g., about 2 percent) based on the total weight of the alloy. The coated particles are then cooled in an inert gas such as argon and molded by compression.

During operation of the fuel cells in which the alkaline earth metal is in the form of an alloy, the alloying metal may or may not enter into the electrochemical reaction and may or may not be anodized (or oxidized). For example, in the case of the amalgams, the mercury undergoes essentially no electrochemical change, being substantially inert and is recovered as mercury or depleted amalgam as the alkaline earth metal fuel is oxidized at the anode. In other cases anodization of the alloying component such as zinc, tin, lead, cadmium, aluminum and magnesium occurs. For example, when the fuel cell is operated using barium alloyed with zinc, oxygen as the oxidant and aqueous electrolyte comprising sodium hydroxide and barium chloride, for example, zinc oxide is formed by anodization and passes into the electrolyte as zincate ion. Similarly, when the alloying component is tin, an oxide of tin is formed at the anode and passes into the electrolyte system as stannate ion. For the purpose of aiding oxidation of the alloying component, various oxidizing agents are added to the aqueous electrolyte bath such as the alkali metal salts of peroxyacids such as the alkali metal persulfates, pertungstates, percarbonates, perchromates and perchlorates. Additionally, a compound may be added to the aqueous electrolyte system in order to form a complex with the alloying component or with the oxide thereof produced by anodization, and thereby effectuate removal of the alloying component as the alkaline earth metal is oxidized electrochemically. For example, when copper or magnesium is the alloying component, a suitable complexing agent is sodium ethylene diamine tetra-acetic acid; when iron is the alloying component, suitable complexing agents are the alkali metal salts of gluconic acid such as sodium gluconate, citrate, oxalate and heptanoate; and when nickel or cobalt are the alloying components, suitable complexing agents are the alkali metal cyanides such as sodium cyanide. Such complexing agents are usually added to the aqueous electrolyte system in an amount which is at least sufficient to complex the alloying component or a compound thereof.

As noted above, the alkaline earth metal may also be employed in combination with a salt of one of the above-enumerated metals, as well as with salts of the alkali metals and alkaline earth metals. For example, typical examples of such compounds are the sulfates, carbonates, halides, fluorides and oxides of barium, lead, tin, zinc, aluminum, lithium, sodium, potassium, strontium and calcium. The alkaline earth metal fuel such as barium is used advantageously when physically admixed or coated with such compounds which pass into the aqueous electrolyte system as the fuel is oxidized at the anode.

The above-described solid alloys and combination of the alkaline earth metal with a metal salt may be used in the form of particles and charged to the anode in the same manner as described above with respect to the use of barium particles in the above-described fuel cells of the accompanying FIGURES 4 and 5. In addition the alloy or combination of fuel with a metal salt may be shaped into blocks or sheets and introduced in the aqueous electrolyte bath as the anode in the manner described above with respect to the operation of the fuel cells of the accompanying FIGURES 6 and 7.

As noted above, the alkaline earth metal also may be employed in the form of a liquid amalgam which usually contains between about 0.1 and about 2 percent by weight of barium. Such amalgams are prepared by a variety of methods. One method comprises simple dissolution of the alkaline earth metal in mercury within the aforesaid amounts. This is accomplished either directly, or by contacting barium chloride with sodium amalgam at about 90° to 100° F. The barium amalgam also may be derived from the electroylsis of aqueous barium chloride in an electrolysis cell in which a mercury cathode is employed.

Figure 10:
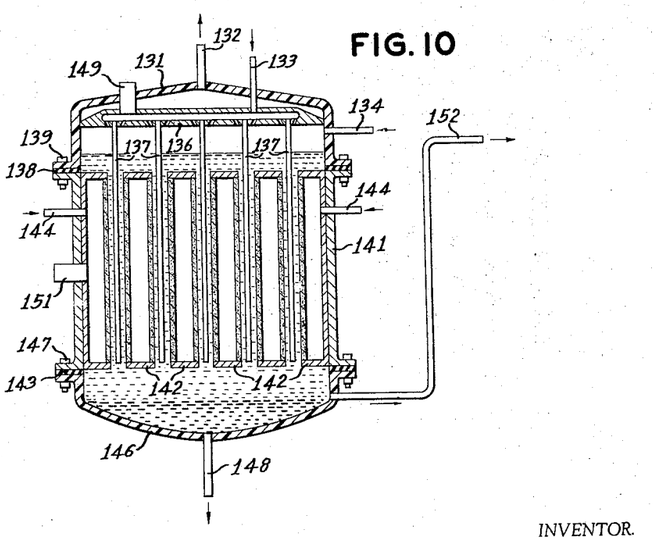
FIGURE 10 represents a longitudinal view in elevation of suitable apparatus in which the alkaline earth metal is used in the form of liquid amalgam.

The apparatus illustrated in the accompanying FIGURE 10 typically illustrates a fuel cell adapted to the use of liquid barium amalgam. The cell is similar to that of the three-compartment apparatus shown in FIGURE 5 and comprises cell cover 131 fitted with horizontal distributor plate 136 connected to barium amalgam inlet 133 and has suspended therefrom a plurality of steel anodes 137. The cell cover is fitted with outlet 132 for venting. The upper section is fastened to the middle section by bolt means 139, for example, and is insulated therefrom by means of insulator plate 138 which is suitably made of hard rubber, Teflon, polyethylene, Kel-F, etc. Electrolyte is fed to the cell by means of inlet 134 fitted in the top section of the cell.

Gas diffusion electrodes 142 are positioned within the middle section of the cell and are fed with oxidant by means of inlet 144. The middle section (metallic) is fastened to lower portion 146 by bolt means 147 and is separated therefrom by insulator plate 143, the bottom section having a sloping lower surface. In operation, barium amalgam introduced through line 133 passes through the apertures of plate 136 such that the amalgam flows downwardly as a continuous stream along the surfaces of anodes 137, the spent or lean amalgam falling by gravity to the sloping lower surface of the cell. As a pool of spent amalgam accumulates in the bottom of the cell, it is withdrawn therefrom through outlet 148. Electrolyte is withdrawn by means of pipe 152 fitted in the lower portion of the cell and above the spent amalgam which settles to the bottom. The height of the electrolyte within the cell is conveniently controlled by the height of pipe 152. In operation, the electrodes are preferably totally immersed in the electrolyte which fills part of the top section of the cell. The electrolyte height is conveniently controlled by outside overflow from pipe 152 which, as shown in the drawing, extends to the height of electrolyte within the cell. The current is withdrawn from the system by electrical connections to anode and cathode terminals 149 and 151, respectively.

It is to be understood that various modifications of the apparatus of FIGURES 4–10 of the accompanying drawings may be made without departing from the scope of the present teachings. For example, the cells may be provided with any suitable means for circulating the aqueous electrolyte such as stirring means or a draft pipe to minimize local build-up of electrolyte concentration or temperature.

The following examples are offered as a further understanding of the present invention and are not to be construed as unnecessarily limiting thereto. Each experiment was conducted in an apparatus comprising a 1-liter glass vessel filled with aqueous electrolyte having immersed therein a gas electrode and a barium metal electrode. The barium electrode or anode consisted of a piece of barium metal into which copper probes attached to a copper rod were inserted. The copper rod and the side and back of the barium metal were coated with methyl methacrylate resin or epoxy resin to prevent further oxidation or attack of the barium metal while standing or during operation of the cell. The system was static, i.e., no electrolyte circulation was used during the experimentation. In each instance, the open circuit potential of the cell was recorded, as well as the potential obtained under various loads imposed by a resistance circuit, the current densities (expressed as amperes per square foot of apparent electrode surface) being calculated from the output current expressed in milliamperes (ma.).

*Example 1*

The above-described fuel cell was charged with an aqueous solution having 0.178 mol per liter of barium chloride and about 0.253 mol per liter of sodium hydroxide dissolved therein, and an ionic strength of 0.8. The anode consisted of barium metal having an apparent electrode diameter of about 11/16 inch. The cathode was porous silver through which gaseous oxygen was passed under a slight pressure during operation of the cell. The cell was operated at ambient temperature (about 25° C.) and atmospheric pressure. The open circuit potential and results obtained at various loads are set forth in the following Table I.

TABLE I

| Cell Voltage (volts) | Output Current (ma.) | Current Density (amps/ft.$^2$) |
| --- | --- | --- |
| 2.65 | ------ | ------ |
| 0.3 | 1,000 | 431 |
| 1.55 | 500 | 216 |
| 1.8 | 380 | 164 |
| 2.0 | 300 | 130 |
| 2.15 | 200 | 86 |
| 2.45 | 100 | 43 |
| 2.35 | 150 | 55 |
| 1.6 | 400 | 172 |
| 0.15 | 900 | 388 |
| 1.4 | 500 | 237 |
| 1.35 | 600 | 258 |
| 1.7 | 350 | 151 |

*Example 2*

The above-described fuel cell was charged with an aqueous solution having 1.64 mols per liter of barium chloride and about 0.09 mol per liter of sodium hydroxide dissolved therein, and an ionic strength of 4.93. The anode consisted of barium metal having an apparent electrode diameter of 11/16 inch and a thickness of 0.75 inch. The cathode was porous silver through which gaseous oxygen was passed under a slight pressure during operation of the cell. The cell was operated at a temperature of 30° C. and atmospheric pressure. At the end of this series of experiments it was observed that heavy barium hydroxide precipitate had formed in the aqueous medium. The open circuit potential and results obtained at various loads are set forth in the following Table II.

TABLE II

| Cell Voltage (volts) | Output Current (ma.) | Current Density (amps/ft.$^2$) |
|---|---|---|
| 2.62 | | |
| 0.6 | 800 | 345 |
| 1.75 | 400 | 173 |
| 2.25 | 200 | 86 |
| 2.35 | 100 | 43 |
| 0.5 | 1,000 | 431 |
| 1.4 | 600 | 258 |

*Example 3*

The electrolyte solution containing precipitated barium hydroxide from Example 2 above was used as the electrolyte bath in another series of experiments in which the barium metal was used as fuel and in which oxygen was passed through a porous silver gas diffusion cathode. The cell was operated at a temperature of 35° C. and atmospheric pressure. The open circuit potential and the results obtained at various loads are tabulated in the following Table III.

TABLE III

| Cell Voltage (volts) | Output Current (ma.) | Current Density (amps/ft.$^2$) |
|---|---|---|
| 2.63 | | |
| 1.25 | 560 | 242 |
| 0.7 | 800 | 345 |
| 1.7 | 400 | 173 |
| 2.2 | 200 | 86 |
| 1.2 | 600 | 258 |

*Example 4*

In this example the electrolyte bath employed was an aqueous solution having 0.65 molar sodium hydroxide and 0.44 molar barium chloride dissolved therein and an ionic strength of 1.97. The oxidant was gaseous oxygen introduced into a gas diffusion cathode of porous silver under a pressure sufficient to allow for passage of the gaseous oxygen through the porous silver. The barium anode consisted of a piece of barium metal about 0.75 inch in thickness and about $11/16$ inch in diameter. The cell was operated at a temperature of 28–36° C. During this experiment it was observed that heavy barium hydroxide precipitated. The open circuit potential of the cell was 2.65 volts. The results obtained at various loads are tabulated in the following Table IV.

TABLE IV

| Cell Voltage (volts) | Output Current (ma.) | Current Density (amps/ft.$^2$) |
|---|---|---|
| 2.65 | | |
| 2.4 | 300 | 130 |
| 2.3 | 330 | 142 |
| 2.2 | 510 | 220 |
| 2.65 | | |
| 2.05 | 620 | 267 |
| 0.7 | 1,550 | 652 |
| 1.85 | 660 | 285 |
| 1.6 | 780 | 332 |
| 1.45 | 920 | 395 |
| 1.2 | 980 | 423 |
| 0.95 | 1,200 | 483 |
| 2.65 | | |

*Example 5*

This experiment was conducted using the same electrolyte bath remaining from Example 4. Again the oxidant was gaseous oxygen and the fuel was barium metal. The cell was operated at a temperature of 30–60° C. During this experiment additional barium hydroxide precipitated. The open circuit potential was 2.65 volts. The results obtained at various loads are set forth in the following Table V.

TABLE V

| Cell Voltage (volts) | Output Current (ma.) | Current Density (amps/ft.$^2$) |
|---|---|---|
| 2.65 | | |
| 2.2 | 400 | 173 |
| 1.5 | 1,100 | 435 |
| 1.95 | 600 | 254 |
| 2.2 | 460 | 199 |
| 1.8 | 660 | 280 |
| 0.75 | 1,700 | 648 |
| 2.65 | | |
| 2.0 | 500 | 211 |
| 2.05 | 500 | 211 |
| 2.2 | 420 | 181 |
| 2.35 | 400 | 172 |
| 2.5 | 230 | 99 |
| 2.55 | 180 | 78 |
| 2.6 | 160 | 69 |
| 2.25 | 390 | 166 |
| 1.9 | 570 | 245 |
| 1.9 | 570 | 245 |
| 2.65 | | |

*Example 6*

This experiment was a continuation of the experiment described as Example 5 above using the same electrolyte bath now containing heavy precipitation of barium salts as a thick slush. The cell was operated at a temperature of 30° C. The open circuit potential was 2.65 volts. The results obtained under these conditions are given in the following Table VI.

TABLE VI

| Cell Voltage (volts) | Output Current (ma.) | Current Density (amps/ft.$^2$) |
|---|---|---|
| 2.65 | | |
| 2.5 | 180 | 78 |
| 2.25 | 300 | 130 |
| 2.05 | 460 | 199 |
| 2.3 | 260 | 112 |
| 2.1 | 400 | 173 |
| 1.9 | 600 | 259 |
| 1.8 | 810 | 347 |
| 0.7 | 1,800 | 754 |
| 1.35 | 1,000 | 431 |
| 1.5 | 910 | 395 |
| 1.75 | 700 | 302 |
| 1.8 | 600 | 259 |
| 2.4 | 240 | 103 |
| 2.45 | 200 | 86 |
| 2.70 | | |

*Example 7*

At the end of this series of experiments described as Examples 4–6, air was passed through the porous silver gas diffusion electrodes instead of oxygen using the same electrolyte system and barium metal as the fuel. The temperature of the electrolyte was maintained at 30–35° C. The results obtained under these conditions are given in the following Table VII.

TABLE VII

| Cell Voltage (volts) | Output Current (ma.) | Current Density (amps/ft.$^2$) |
|---|---|---|
| 2.62 | | |
| 2.2 | 300 | 130 |
| 2.3 | 200 | 80 |
| 1.72 | 600 | 258 |
| 1.4 | 800 | 345 |
| 1.1 | 1,000 | 431 |
| 0.8 | 1,200 | 517 |
| 0.5 | 1,500 | 646 |
| 0.6 | 1,700 | 733 |
| 1.95 | 500 | 216 |
| 2.35 | 200 | 86 |
| 2.42 | 160 | 67 |
| 2.5 | 120 | 52 |
| 2.63 | | |
| 2.25 | 380 | 164 |
| 1.85 | 700 | 303 |
| 0.65 | 1,950 | 819 |
| 0.60 | 2,100 | 906 |
| 2.63 | | |

In each of Tables I–VII, the results are given in the order actually taken to show the response of the fuel cell system to change in load. In each case the response to the various loads was instantaneous and the open circuit potential obtained initially was also obtained instantaneously when the load imposed upon the cell was removed.

Figure 1:
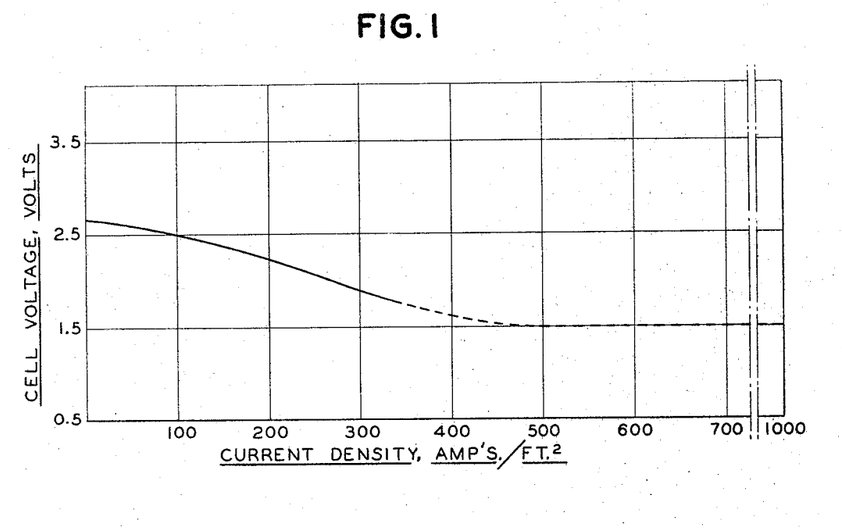
FIGURE 1 of the accompanying drawing is a power curve of the alkaline earth metal-oxygen fuel cell in which the aqueous medium contains added electrolyte A and added electrolyte B.

The experimental results of Examples 4–6 were used as the basis of the power curve shown in the accompanying FIGURE 1. The dotted portion of the curve is also based on experimental data obtained at the high current densities corrected for the tendency of the surface of the anode to increase in temperature.

For the purpose of comparison and demonstration of the improvement in power output which is realized by the use of the electrolyte system of this invention, the following Examples 8–10 are presented. In these examples the aqueous medium was alkaline but no salt (electrolyte B) was added thereto.

Example 8

In this example the electrolyte bath employed was aqueous barium hydroxide having 0.215 mol per liter of barium ion and 0.424 mol per liter of hydroxyl ion, dissolved therein an an ionic strength of 0.62. Gaseous oxygen was introduced into a gas diffusion electrode of porous silver under a pressure sufficient to allow for passage of the gaseous oxygen through the porous silver. The barium anode consisted of a piece of barium metal about 0.5 inch in thickness and having a surface area of 0.153 inch. The cell was operated at 40° C. at which the open circuit potential was 2.55 volts. The results obtained at various loads are tabulated in the following Table VIII.

TABLE VIII

| Cell Voltage (volts) | Output Current (ma.) | Current Density (amps/ft.$^2$) |
|---|---|---|
| 2.55 | | |
| 1.55 | 90 | 87 |
| 1.5 | 150 | 144 |
| 1.46 | 210 | 203 |
| 1.36 | 270 | 259 |
| 1.35 | 310 | 297 |
| 1.35 | 310 | 297 |
| 1.9 | 160 | 154 |
| 1.75 | 100 | 96 |

Example 9

In this example the electrolyte employed was an aqueous barium hydroxide solution saturated in barium ion and in hydroxyl ion. Gaseous oxygen was introduced into a porous silver electrode in accordance with the procedure of Example 8 above. The barium anode consisted of barium metal having a surface area of 0.145 square inch. The cell was operated at room temperature (about 25° C.) and had an open circuit potential of 2.6 volts. The results obtained at various loads are given in the following Table IX.

TABLE IX

| Cell Voltage (volts) | Output Current (ma.) | Current Density (amps/ft.$^2$) |
|---|---|---|
| 2.6 | | |
| 2.0 | 40 | 40 |
| 1.6 | 100 | 100 |
| 1.3 | 180 | 180 |
| 1.0 | 240 | 240 |
| 0.7 | 300 | 300 |

Example 10

In this example the electrolyte employed was aqueous barium hydroxide having 0.186 mol per liter of barium ion and 0.353 mol per liter of hydroxyl ion, dissolved therein and an ionic strength of 0.51. Gaseous oxygen was introduced through a porous silver gas diffusion electrode in accordance with the procedure employed in Example 8 above. The barium anode consisted of a piece of barium metal having a thickness of 0.75 inch and a diameter of 0.68 inch. The cell was operated at 25° C. and had an open circuit potential of 2.65 volts. The results obtained at various loads are set forth in the following Table X.

TABLE X

| Cell Voltage (volts) | Output Current (ma.) | Current Density (amps/ft.$^2$) |
|---|---|---|
| 2.65 | | |
| 1.95 | 160 | 69 |
| 1.62 | 300 | 130 |
| 0.91 | 670 | 290 |
| 1.28 | 480 | 214 |
| 2.60 | | |

Figure 2:
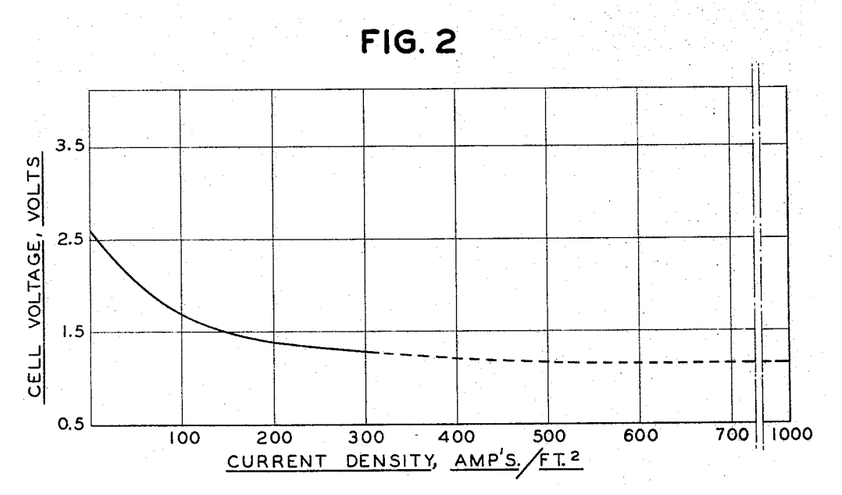
FIGURE 2 of the accompanying drawing is a power curve of the alkaline earth metal-oxygen fuel cell in which the aqueous medium comprises electrolyte A and no added electrolyte B.

The data of Examples 8–10 above were used as the basis of the power curve of the accompanying FIGURE 2, the dotted portion being an extrapolation showing the power performance of the system at high current densities.

Comparison of the power curves of FIGURES 1 and 2 shows that the power output at various loads is markedly higher using an aqueous electrolyte bath comprising the combination of electrolyte A and electrolyte B, as compared with the power output of the system in which the aqueous alkaline medium contained only electrolyte A. For example, inspection of the graphs of FIGURES 1 and 2 shows that at a cell potential of 2.0 volts, a current intensity of 60 amperes per square foot (120 watts) is generated when only electrolyte A is added to the aqueous medium whereas at the same voltage the fuel cells of this invention generate a current intensity of 275 amperes per square foot (550 watts), or more than four times the energy.

Figure 11:
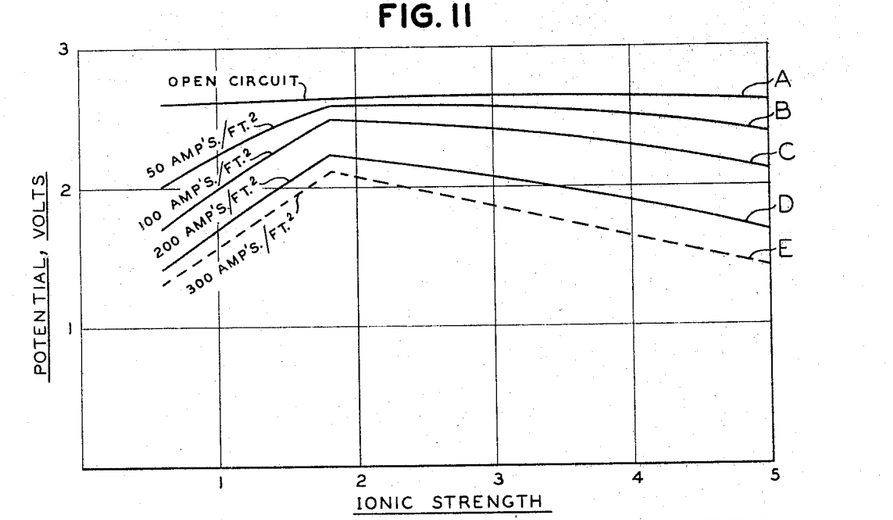
FIGURE 11 of the accompanying drawings is a series of graphs showing the correlation of cell voltage with ionic strength of the electrolyte.

The results obtained by the above examples were used as the basis of the graph presented in the accompanying FIGURE 11. These graphs show the correlation of ionic strength of the various electrolyte systems employed, with the cell potential at no load (O.C.P.) (line labeled A) and at current densities of 50 (line labeled B), 100 (line labeled C), and 200 (line labeled D) amperes per square foot of apparent electrode surface. The dotted line labeled E is also based on experimental data obtained at a load of 300 amperes per square foot of apparent electrode surface, corrected to account for the tendency of the surface of the electrode to increase in temperature.

Inspection of these graphs shows that at an ionic strength of about 0.6 and using the electrolyte system of Examples 8–10 containing barium hydroxide and no added electrolyte B, the cell potential in each instance was lower than that of the cells in which the electrolyte systems of this invention were employed. These graphs also show that at an ionic strength between about 1 and about 3 the cell potential is at a maximum.

In another series of experiments conducted in the above-described apparatus using barium as the anode reactant and oxygen as the cathode reactant using two different concentrations of electrolyte A and electrolyte B, the operating temperature of the cell was varied. Using an aqueous medium containing 0.44 mol per liter of barium chloride and 0.65 mol per liter of sodium hydroxide and having an ionic strength of about 1.9 the following open circuit potentials in volts was obtained at the indicated temperatures: 2.65 at 30° C.; 2.8 at 65° C.; and 2.85 at 75° C. Using an aqueous medium containing 1.62 mols per liter of barium chloride and 0.27 mol per liter of sodium hydroxide and having an ionic strength of about 5.1, the following open circuit potential in volts was obtained at the indicated temperatures: 2.73 at 60° C.; 2.76 at 70° C.; and 2.80 at 80° C. These data were used as the basis of the plots shown in the accompanying FIGURE 3. The line labeled A is based on the data obtained using the solution of ionic strength of about 1.9. The line labeled B is based on the data obtained with the solution of the higher ionic strength of about 5.1, except that the open circuit potential shown at 30° C., is based on the results obtained in Example 2 above in which the aqueous electrolyte system yielded an ionic strength of about 4.9.

Figure 3:
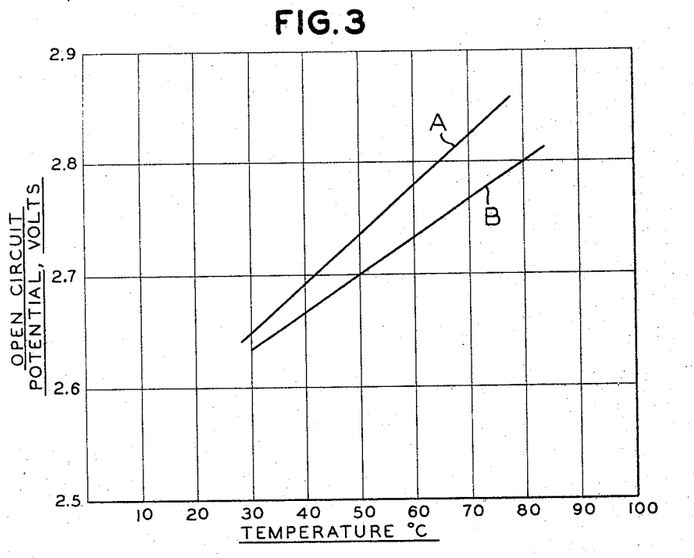
FIGURE 3 is a graph showing the correlation of cell voltage of the fuel cells of this invention with the operating temperature of the cell.

Inspection of the graph of FIGURE 3 shows that in each instance the open circuit potential increased with increasing electrolyte temperature. However, as the temperature was increased the improvement realized with the first of the said electrolyte system was markedly greater than that realized using the solution of the higher ionic strength.

Thus it is apparent that by the process of this invention the power performance of a fuel cell in which an alkaline earth metal is used in combination with oxygen is greatly improved by the use of an aqueous medium containing a metal hydroxide and a metal salt. The electrolyte system of this invention also improves the power output of the fuel cell in which the alkaline earth metal is used in the form of an alloy. It is to be understood that various modifications of the process and apparatus described herein may become apparent to those skilled in the art without departing from the scope of this invention.

Having described my invention, I claim:

1. A method for the generation of electrical energy which comprises providing an electrochemical cell containing an aqueous medium and having at least one anode and at least one cathode therein, said aqueous medium having an alkali metal hydroxide and an alkaline earth metal salt dissolved therein, said anode being in contact with a fuel comprising an elemental alkaline earth metal, passing a gas comprising oxygen into the cell such that it is contacted with the cathode, maintaining said aqueous medium in the liquid phase and at a temperature between about 20° C. and about 250° C., electrical energy thereby being generated by reaction of elemental alkaline earth metal at the anode to form corresponding alkaline earth metal cations and of oxygen at the cathode to form hydroxyl anions.

2. The process of claim 1 in which said elemental alkaline earth metal is barium.

3. The process of claim 1 in which said elemental alkaline earth metal is calcium.

4. The process of claim 1 in which said elemental alkaline earth metal is strontium.

5. The process of claim 1 in which said alkaline earth metal salt is an alkaline earth metal halide.

6. The process of claim 1 in which said alkaline earth metal salt is an oxyhalide.

7. The process of claim 1 in which said alkaline earth metal salt is a thiocyanate.

8. The process of claim 1 in which said salt is an organic salt of an alkaline earth metal.

9. The process of claim 1 in which said gas comprising oxygen is pure molecular oxygen.

10. A method for the generation of electrical energy which comprises providing an electrochemical cell containing an aqueous medium and having at least one anode and at least one cathode therein, said aqeuous medium having an alkali metal hydroxide and an alkaline earth metal salt dissolved therein, said anode being in contact with a material selected from the group consisting of an unalloyed elemental alkaline earth metal, a solid alloy of an elemental alkaline earth metal and a liquid amalgam of an elemental alkaline earth metal, passing a gas comprising oxygen into the cell such that it is contacted with the cathode, maintaining said aqueous medium in the liquid phase and at a temperature between about 20° C. and about 250° C., electrical energy thereby being generated by conversion of elemental alkaline earth metal at the anode to corresponding alkaline earth metal cations and of oxygen at the cathode to form hydroxyl anions.

11. The process of claim 10 in which said alkali metal hydroxide is sodium hydroxide.

12. The process of claim 10 in which said alkali metal hydroxide is potassium hydroxide.

13. The process of claim 10 in which said alkali metal hydroxide is lithium hydroxide.

14. A method for the generation of electrical energy which comprises providing an electorchemical cell containing an aqueous medium and having at least one anode and at least one cathode therein, said aqueous medium containing (1) an alkali metal hydroxide in an amount sufficient to yield an initial hydroxyl ion concentration between about 0.8 and about 0.2 molar and (2) an alkaline earth metal chloride in an amount sufficient to yield an initial concentration of alkaline earth metal ions of between about 0.2 and about 1.0 molar, said anode comprising an elemental alkaline earth metal as fuel, passing an oxygen-containing gas into the cell such that it is contacted with the cathode, maintaining the aqueous medium in the liquid phase and at a temperature between about 20° C. and about 250° C., electrical energy thereby being generated by reaction of the alkaline earth metal as the anodic fuel to form corresponding alkaline earth metal cations and of oxygen at the cathode to form hydroxyl anions.

15. A method for the generation of electrical energy which comprises providing an electrochemical cell containing an aqueous medium and having at least one anode and at least one cathode therein, said aqueous medium having an alkali metal hydroxide and a barium salt dissolved therein, said anode being in contact with a material selected from the group consisting of unalloyed barium, a solid alloy of barium and a liquid amalgam of barium, passing an oxygen-containing gas into the cell such that it is contacted with the cathode, maintaining said aqueous medium in the liquid phase and at a temperature between about 20° C. and about 250° C., electrical energy thereby being generated by conversion of barium at the anode to form barium cations and of oxygen at the cathode to form hydroxyl anions.

16. A method for the direct conversion of chemical energy into electrical energy which comprises providing an electrochemical cell containing an aqueous medium and having at least one anode comprising elemental barium and at least one cathode disposed therein, said aqueous medium having sodium hydroxide and barium chloride dissolved therein, passing an oxygen-containing gas into the cell such that it is contacted with the cathode, maintaining the aqueous medium in the liquid phase and at a temperature between about 20° C. and about 250° C., electrical energy thereby being generated by reaction of elemental barium as the anodic fuel to form barium cations and of oxygen at the cathode to produce hydroxyl anions.

17. In a fuel cell in which a gaseous reactant is contacted with an electrode and in which a liquid electrolyte bath is employed, the improvement which comprises a gas diffusion electrode comprising in combination a middle section 1 comprising an outer electroconductive porous surface and an inner chamber, said middle section having means in association therewith for feeding gaseous reactant to said inner chamber, said middle section being in association with an upper section 2 and a lower section 3, each of said sections 2 and 3 being aligned with said middle section 1 and having apertures which are open to the interior of the cell, inlet means in association with one of said sections 2 and 3 to which liquid electrolyte is fed and from which liquid electrolyte passes by means of the apertures therein and into the interior of the cell, and outlet means in association with the other of said sections 2 and 3 by means of which liquid electrolyte passes from the interior of the cell.

18. In a fuel cell in which a gaseous reactant is employed at one of the electrodes and in which an aqueous electrolyte bath is employed, the improvement which comprises a gas diffusion electrode comprising in combination a middle section 1 having an outer porous electroconductive surface and an inner chamber, said middle section being in association with an upper section 2 which is aligned with said middle section and which is provided with inlet means to which aqueous medium is fed from an external source, said upper section 2 having apertures therein through which aqueous medium passes from said inlet means into the interior of the cell, said middle section being in further association with a lower section 3 which is aligned with said middle section, said lower section 3 comprising two tubes in concentric relationship, one of said tubes leading into the inner chamber of said middle section 1 and by means of which gaseous reactant is fed into said inner chamber, the other tube of lower section 3 being in open contact with aqueous medium contained within the cell by means of apertures therein such that aqueous medium passes from the interior of the cell through the apertures of said tube and out of the cell.

References Cited by the Examiner

UNITED STATES PATENTS

| | | | |
|---|---|---|---|
| 963,852 | 7/1910 | Benko | 136—86 |
| 2,097,077 | 10/1937 | Oppenheim | 136—86.2 |
| 2,275,281 | 3/1942 | Berl | 136—86.2 |
| 2,564,495 | 8/1951 | Mullen | 136—90 |
| 2,921,110 | 1/1960 | Crowley | 136—86 |
| 2,934,583 | 4/1960 | Stevens | 136—100 |
| 3,031,518 | 4/1962 | Werner et al. | 136—86 |
| 3,057,946 | 10/1962 | Eidensohn | 136—86 |

WINSTON A. DOUGLAS, *Primary Examiner.*

JOHN R. SPECK, *Examiner.*

H. FEELEY, *Assistant Examiner.*